US012446087B2

(12) United States Patent
Tomeba et al.

(10) Patent No.: US 12,446,087 B2
(45) Date of Patent: Oct. 14, 2025

(54) COMMUNICATION APPARATUS AND COMMUNICATION METHOD

(71) Applicant: Sharp Kabushiki Kaisha, Osaka (JP)

(72) Inventors: Hiromichi Tomeba, Sakai (JP); Yasuhiro Hamaguchi, Sakai (JP); Hideo Namba, Sakai (JP); Atsushi Shirakawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 375 days.

(21) Appl. No.: 17/926,649

(22) PCT Filed: May 21, 2021

(86) PCT No.: PCT/JP2021/019413
§ 371 (c)(1),
(2) Date: Nov. 21, 2022

(87) PCT Pub. No.: WO2021/241452
PCT Pub. Date: Dec. 2, 2021

(65) Prior Publication Data
US 2023/0199882 A1    Jun. 22, 2023

(30) Foreign Application Priority Data
May 29, 2020   (JP) .................. 2020-093908

(51) Int. Cl.
*H04W 76/15*   (2018.01)
*H04W 72/0446*   (2023.01)

(52) U.S. Cl.
CPC ....... *H04W 76/15* (2018.02); *H04W 72/0446* (2013.01)

(58) Field of Classification Search
CPC ............. H04W 76/15; H04W 72/0446; H04W 74/0816; H04W 84/12; H04W 74/0808;
(Continued)

(56) References Cited

U.S. PATENT DOCUMENTS 12,144,063 B2 *  11/2024  Chu ..................... H04L 1/1621
2019/0141651 A1 *  5/2019  Venkatachalam Jayaraman .........
H04W 56/0005

(Continued)

FOREIGN PATENT DOCUMENTS

| CN | 113966643 A | * | 1/2022 | ........ H04W 74/0866 |
| EP | 3716722 A1 | * | 9/2020 | ........ H04W 74/0833 |
| TW | 202106071 A | * | 2/2021 | ............ H04W 72/23 |

OTHER PUBLICATIONS

S. Kim, M. S. Sim, C.-B. Chae and S. Choi, "Asymmetric Simultaneous Transmit and Receive in WiFi Networks," in IEEE Access, vol. 5, pp. 14079-14094, 2017, doi: 10.1109/ACCESS.2017.2723562 (Year: 2017).*

(Continued)

*Primary Examiner* — Ayaz R Sheikh
*Assistant Examiner* — Louis Samara
(74) *Attorney, Agent, or Firm* — Keating & Bennett, LLP

(57) ABSTRACT

A communication apparatus that maintains a first connection and a second connection, the communication apparatus including a frame generator configured to generate a first frame and a second frame, and a transmitter configured to transmit the first frame based on the first connection and transmit the second frame based on the second connection, wherein a frame length of the first frame and a frame length of the second frame are configured based on destination information of the first frame and destination information of the second frame, respectively.

6 Claims, 12 Drawing Sheets

(58) Field of Classification Search
CPC .............. H04W 56/0005; H04W 72/30; H04L 5/0044; H04L 1/1621
See application file for complete search history.

(56) References Cited

U.S. PATENT DOCUMENTS

| | | | |
|---|---|---|---|
| 2020/0037288 A1* | 1/2020 | Huang | H04W 72/30 |
| 2020/0314920 A1* | 10/2020 | Seok | H04W 74/0808 |
| 2021/0211375 A1* | 7/2021 | Kwon | H04W 72/535 |

OTHER PUBLICATIONS

Wang et al., "Multi-Link Feature Candidates For Release 1", IEEE 802.11-20/0115r4, Jan. 10, 2020, 5 pages.

* cited by examiner

COMMUNICATION APPARATUS AND COMMUNICATION METHOD

TECHNICAL FIELD

The present invention relates to a communication apparatus and a communication method.

This application claims priority based on JP 2020-93908 filed on May 29, 2020, the contents of which are incorporated herein by reference.

BACKGROUND ART

The Institute of Electrical and Electronics Engineers Inc. (IEEE) is in the process of standardizing IEEE 802.11ax to achieve higher speed than IEEE 802.11 which is a wireless Local Area Network (LAN) standard, and wireless LAN devices compliant with the draft specification are available in the market. The standardization of IEEE 802.11be, which is a standard subsequent to IEEE 802.11ax, has been recently started. As the wireless LAN devices are rapidly widely used, in the standardization of IEEE 802.11be, studies have been in progress to further improve throughput per user in environments where the wireless LAN devices are densely installed.

The wireless LAN allows a frame transmission to be performed using unlicensed bands in which radio communication can be performed without permission (license) by nations or regions. The unlicensed bands currently widely used include a 2.4 GHz band and a 5 GHz band. The 2.4 GHz band has a relatively wide coverage, but largely suffers from interference between communication apparatuses and does not have a wide communication bandwidth. On the other hand, the 5 GHz band has a wide communication band, but does not have a wide coverage. Accordingly, to achieve various service applications on the wireless LAN, frequency bands to be used need to be switched appropriately. However, the existing wireless LAN apparatuses need to terminate the current connection once in order to switch the frequency band used for communication.

Therefore, in the IEEE802.11be standardization, a Multi-link Operation (MLO) that enables a communication apparatus to maintain multiple connections (links) has been discussed (see NPL 1). According to the multi-link operation, the communication apparatus can maintain multiple connections each of which has a different configuration for radio resources to be used and communications. In other words, by use of the multi-link operation, the communication apparatus can simultaneously maintain the connections in different frequency bands, and thus, can change the frequency band to transmit the frame without performing a reconnection operation.

CITATION LIST

Non Patent Literature

NPL 1: IEEE 802.11-20/0115-04, January 2020.

SUMMARY OF INVENTION

Technical Problem

However, the use of the multi-link operation means that a case may occur that the frames are transmitted and/or received independently in the multiple connections. This means that during the time a frame transmission is performed in one connection, a frame reception may be performed in another connection at the same time. Thus, this also means that in order to perform the multi-link operation, the communication apparatus needs to support Simultaneously Transmission and Reception (STR) in which the frame transmission and the frame reception are performed at the same time. In order to perform the simultaneous transmission and reception, however, requirements for the hardware are high, and thus, it is difficult for all communication apparatuses to support the simultaneous transmission and reception.

An aspect of the present invention has been made in view of the problems described above, and an object of the present invention is to disclose a communication apparatus and a communication method for efficiently performing a multi-link operation in a wireless LAN system in which an apparatus supporting simultaneous transmission and reception and an apparatus not supporting simultaneous transmission and reception coexist.

Solution to Problem

A communication apparatus and a communication method according to an aspect of the present invention for solving the aforementioned problems are as follows.

(1) Specifically, a communication apparatus according to an aspect of the present invention is a communication apparatus that maintains a first connection and a second connection, the communication apparatus including a frame generator configured to generate a first frame and a second frame, and a transmitter configured to transmit the first frame based on the first connection and transmit the second frame based on the second connection, wherein a frame length of the first frame and a frame length of the second frame are configured based on destination information of the first frame and destination information of the second frame, respectively.

(2) The communication apparatus according to an aspect of the present invention is described in (1) above, wherein in a case that the destination information of the first frame and the destination information of the second frame indicate that destination of the first frame is identical to destination of the second frame, a frame end of the first frame and a frame end of the second frame are to be simultaneously reached.

(3) The communication apparatus according to an aspect of the present invention is described in (1) above, wherein in a case that the destination information of the second frame indicates prescribed information, a frame end of the first frame and a frame end of the second frame are to be simultaneously reached.

(4) The communication apparatus according to an aspect of the present invention is described in (1) above, wherein the first frame includes a first period and a second period, and the frame generator states, in the first frame, information indicating a period represented by a sum of the first period and the second period, and information indicating either the first period or the second period.

(5) A communication method according to an aspect of the present invention is a communication method in a communication apparatus that maintains a first connection and a second connection, the communication method including the steps of generating a first frame and a second frame, transmitting the first frame based on the first connection and transmitting the second frame based on the second connection, and configuring a frame length of the first frame and a frame length of the second frame based on destination information of the first frame and destination information of the second frame, respectively.

Advantageous Effects of Invention

According to an aspect of the present invention, it is possible to efficiently perform a multi-link operation in a wireless LAN system in which an apparatus supporting simultaneous transmission and reception and an apparatus not supporting simultaneous transmission and reception coexist, contributing to improvement in a user throughput of a wireless LAN device.

DESCRIPTION OF EMBODIMENTS

Figure 1:
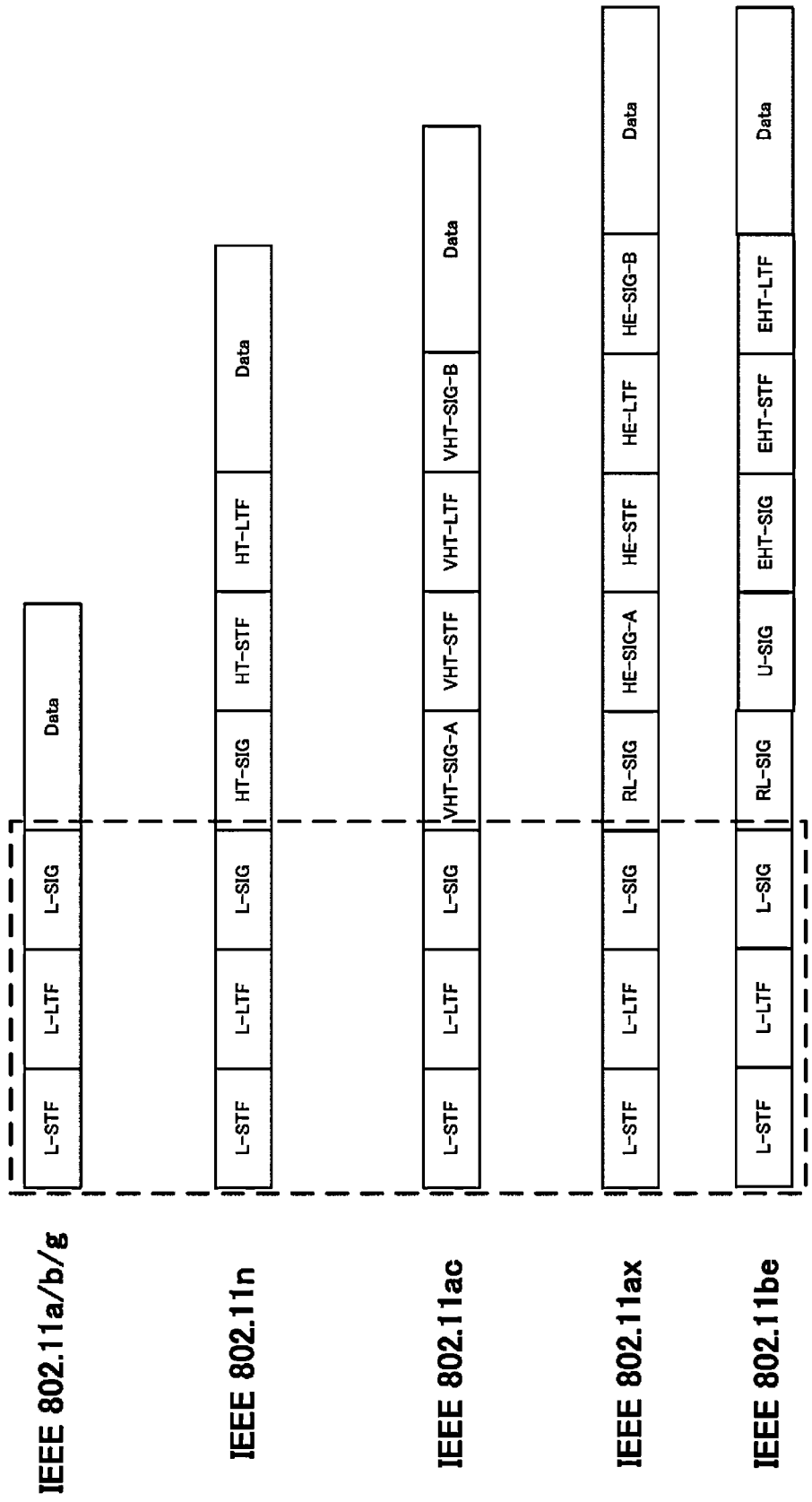
FIG. 1 is a diagram illustrating an example of a frame configuration according to an aspect of the present invention.

A communication system according to the present embodiment includes a radio transmitting apparatus (access point apparatus, base station apparatus: access point, base station apparatus) and multiple radio receiving apparatuses (station apparatuses, terminal apparatuses: stations, terminal apparatuses). A network including the base station apparatus and the terminal apparatuses is referred to as a basic service set (BSS, management range). The station apparatus according to the present embodiment can include the function of the access point apparatus. Similarly, the access point apparatus according to the present embodiment can include the function of the station apparatus. Therefore, in a case that a communication apparatus is simply mentioned below, the communication apparatus can indicate both the station apparatus and the access point apparatus.

The base station apparatus and the terminal apparatuses in the BSS are assumed to perform communication based on Carrier sense multiple access with collision avoidance (CSMA/CA). Although an infrastructure mode in which the base station apparatus performs communication with the multiple terminal apparatuses is targeted in the present embodiment, the method of the present embodiment can also be performed in an ad hoc mode in which the terminal apparatuses perform communication directly with each other. In the ad hoc mode, the terminal apparatus forms the BSS instead of the base station apparatus. The BSS in the ad hoc mode is also referred to as an Independent Basic Service Set (IBSS). In the following description, a terminal apparatus that forms the IBSS in the ad hoc mode can also be regarded as a base station apparatus.

In an IEEE 802.11 system, each apparatus can transmit transmission frames of multiple frame types with a common frame format. Each transmission frame is defined by a physical (PHY) layer, a Medium Access Control (MAC) layer, and a Logical Link Control (LLC) layer.

A transmission frame of the PHY layer is referred to as a physical protocol data unit (PPDU: PHY protocol data unit or physical layer frame). The PPDU includes a physical layer header (PHY header) including header information and the like for performing signal processing in the physical layer, a physical service data unit (PSDU: PHY service data unit or MAC layer frame) that is a data unit processed in the physical layer, and the like. The PSDU can include an Aggregated MAC protocol data unit (A-MPDU) in which multiple MPDUs as a retransmission unit in a radio section are aggregated.

The PPDU is modulated in accordance with the compliant standard. In IEEE 802.11n standards, for example, the PPDU is modulated into an orthogonal frequency division multiplexing (OFDM) signal.

The PHY header includes reference signals such as a Short training field (STF) used for detection, synchronization, and the like of signals and a Long training field (LTF) used for obtaining channel information for demodulating data, and a control signal such as a Signal (SIG) including control information for demodulating data. The STF is classified into a Legacy-STF (L-STF), a High throughput-STF (HT-STF), a Very high throughput-STF (VHT-STF), a High efficiency-STF (HE-STF), an Extremely High Throughput-STF (EHT-STF), and the like in accordance with compliant standards, and the LTF and the SIG are also similarly classified into the L-LTF, the HT-LTF, the VHT-LTF, the HE-LTF, the L-SIG, the HT-SIG, the VHT-SIG, HE-SIG, and the EHT-SIG. The VHT-SIG is further classified into VHT-SIG-A1, VHT-SIG-A2, and VHT-SIG-B. Similarly, the HE-SIG is classified into HE-SIG-A1 to 4 and HE-SIG-B. On the assumption of updating of technologies in the same standard, a Universal SIGNAL (U-SIG) field including additional control information can be included.

The SIG can include, as information for demodulating a received frame, information indicating a modulation and coding scheme (MCS), the spatial data multiplexing number (the number of layers), the number of spatial multiplexing users, information indicating the presence or absence of spatial-temporal coding (e.g., information indicating the presence or absence of spatial-temporal coding transmission diversity), information indicating a destination of the frame, information associated with a frame length of the frame (TXOP, etc.), and the like.

Furthermore, the PHY header can include information for identifying a BSS of a transmission source of the transmission frame (hereinafter, also referred to as BSS identification information). The information for identifying the BSS can be, for example, a Service Set Identifier (SSID) of the BSS or a MAC address of a base station apparatus of the BSS.

The information for identifying the BSS can be a value unique to the BSS (such as a BSS color, for example) other than the SSID and the MAC address.

Note that the PHY header including the SIG includes information necessary for data demodulation, and thus, desirably has resistance to radio errors. The PHY header is desirably received correctly also by a wireless LAN apparatus other than a wireless LAN apparatus serving as the destination. Considering that there are wireless LAN apparatuses having a poor communication environment, the PHY header, particularly the SIG, is desirably configured with a highly redundant modulation scheme or coding rate. For example, the communication apparatus can configure a modulation scheme having a small modulation order such as BPSK modulation or a low coding rate for the PHY header.

The MPDU includes a MAC layer header (MAC header) including header information and the like for performing signal processing in the MAC layer, a MAC service data unit (MSDU) that is a data unit processed in the MAC layer or a frame body, and a Frame check sequence (FCS) for checking whether there is an error in the frame. The multiple MSDUs can be aggregated as an Aggregated MSDU (A-MSDU).

The frame types of transmission frames of the MAC layer are roughly classified into three frame types, namely a management frame for managing a connection state and the like between apparatuses, a control frame for managing a communication state between apparatuses, and a data frame including actual transmission data, and each frame type is further classified into multiple kinds of subframe types. The control frame includes a reception completion notification (Acknowledge (Ack)) frame, a Request to send (RTS) frame, a reception preparation completion (Clear to send (CTS)) frame, and the like. The management frame includes a Beacon frame, a Probe request frame, a Probe response frame, an Authentication frame, a connectivity (Association) request frame, a connectivity (Association) response frame, and the like. The data frame includes a Data frame, a polling (CF-poll) frame, and the like. Each apparatus can recognize a frame type and a subframe type of a received frame by reading detail of the frame control field included in a MAC header.

Note that Ack may include Block Ack. Block Ack can perform a reception completion notification to multiple MPDUs.

The beacon frame includes a Field in which an interval at which a beacon is transmitted (Beacon interval) and an SSID are stated. The base station apparatus can periodically broadcast the BSS of the beacon frame, and each terminal apparatus can recognize the base station apparatus in the surroundings of the terminal apparatus by receiving the beacon frame. The action of the terminal apparatus recognizing the base station apparatus based on the beacon frame broadcast from the base station apparatus is referred to as Passive scanning. On the other hand, an action of the terminal apparatus searching for the base station apparatus by broadcasting a probe request frame in the BSS is referred to as Active scanning. The base station apparatus can transmit a probe response frame as a response to the probe request frame, and detail stated in the probe response frame is equivalent to that in the beacon frame.

The terminal apparatus recognizes the base station apparatus and performs processing to establish connection with the base station apparatus. The connection processing is classified into an Authentication procedure and a connection (Association) procedure. The terminal apparatus transmits an authentication frame (authentication request) to the base station apparatus with which connection is desired. Once the base station apparatus receives the authentication frame, then the base station apparatus transmits, to the terminal apparatus, an authentication frame (authentication response) including a status code indicating whether authentication can be made for the terminal apparatus. The terminal apparatus can determine whether the terminal apparatus has been authenticated by the base station apparatus by reading the status code stated in the authentication frame. Note that the base station apparatus and the terminal apparatus can exchange the authentication frame multiple times.

After the authentication procedure, the terminal apparatus transmits a connectivity request frame to the base station apparatus in order to perform the connection procedure. Once the base station apparatus receives the connectivity request frame, the base station apparatus determines whether to allow the connection of the terminal apparatus and transmits a connectivity response frame to provide a notification regarding the determination. In the connectivity response frame, an association identification number (Association identifier (AID)) for identifying the terminal apparatus is stated in addition to a status code indicating whether to perform the connection processing. The base station apparatus can manage multiple terminal apparatuses by configuring different AIDs for the terminal apparatuses for which the base station apparatus has allowed connection.

After the connection processing is performed, the base station apparatus and the terminal apparatus perform actual data transmission. In the IEEE 802.11 system, a Distributed Coordination Function (DCF), a Point Coordination Function (PCF), and a function in which the DCF and the PCF are enhanced (an Enhanced distributed channel access (EDCA), a Hybrid coordination function (HCF), and the like) are defined. A case that the base station apparatus transmits signals to the terminal apparatus using the DCF will be described below as an example.

In the DCF, the base station apparatus and the terminal apparatus perform Carrier sense (CS) for checking a utilization condition of a radio channel in the surroundings of the apparatuses themselves prior to communication. For example, in a case that the base station apparatus being a transmitting station receives a signal in a level higher than a predefined Clear channel assessment level (CCA level) in the radio channel, transmission of the transmission frame through the radio channel is postponed. Hereinafter, a state in which a signal in a level equal to or higher than the CCA level is detected in the radio channel is referred to as a Busy state, and a state in which a signal in a level equal to or higher than the CCA level is not detected is referred to as an Idle state. In this manner, CS performed based on a power (reception power level) of a signal actually received by each apparatus is referred to as physical carrier sense (physical CS). Note that the CCA level is also referred to as a carrier sense level (CS level) or a CCA threshold (CCAT). Note that in a case that a signal in a level equal to or higher than the CCA level is detected, the base station apparatus and the terminal apparatus start to perform an operation of demodulating at least a signal of the PHY layer.

The base station apparatus performs carrier sense corresponding to a frame interval (Inter frame space (IFS)) in accordance with the type of transmission frame to be transmitted and determines which of the busy state and the idle state the radio channel is in. The period during which the base station apparatus performs carrier sense differs depending on the frame type and the subframe type of transmission frame to be transmitted by the base station apparatus from now on. In the IEEE 802.11 system, multiple IFSs with different periods are defined, that are a short frame interval (Short IFS: SIFS) used for a transmission frame to which the highest priority is given, a polling frame interval (PCF IFS: PIFS) used for a transmission frame with relatively high priority, a distributed control frame interval (DCF IFS: DIFS) used for a transmission frame with the lowest priority, and the like. In a case that the base station apparatus transmits a data frame with the DCF, the base station apparatus uses the DIFS.

The base station apparatus waits for DIFS and then further waits for a random backoff time to prevent frame collision. In the IEEE 802.11 system, a random backoff time called a Contention window (CW) is used. CSMA/CA is based on the assumption that a transmission frame transmitted by a certain transmitting station is received by a receiving station in a state with no interference from other transmitting stations. Therefore, in a case that transmitting stations transmit transmission frames at the same timing, the frames collide against each other, and the receiving station cannot receive them properly. Thus, each transmitting station waits for a randomly configured time before starting the transmission, such that the collision of the frames is avoided. In a case that the base station apparatus determines, through carrier sense, that a radio channel is in an idle state, the base station apparatus starts counting-down of CW and acquires a transmission right for the first time after CW becomes zero, and thus can transmit the transmission frame to the terminal apparatus. Note that in a case that the base station apparatus determines through the carrier sense that the radio channel is in the busy state during the counting-down of CW, the base station apparatus stops the counting-down of CW. In a case that the radio channel is brought into the idle state, then the base station apparatus restarts the counting-down of the remaining CW after the previous IFS.

A terminal apparatus being a receiving station receives a transmission frame, reads a PHY header of the transmission frame, and demodulates the received transmission frame. Then, the terminal apparatus can recognize whether the transmission frame is destined to the terminal apparatus by reading a MAC header of the demodulated signal. Note that the terminal apparatus can also determine the destination of the transmission frame based on information stated in the PHY header (for example, a group identification number (Group identifier (Group ID: GID)) stated in the VHT-SIG-A).

In a case that the terminal apparatus determines the received transmission frame as destined to the terminal apparatus and succeeds in demodulation of the transmission frame without any error, the terminal apparatus has to transmit an ACK frame indicating that the frame has been properly received to the base station apparatus being the transmitting station. The ACK frame is one of transmission frames with the highest priority transmitted only after the waiting for the SIFS period (with no random backoff time). The base station apparatus ends the series of communication in response to reception of the ACK frame transmitted from the terminal apparatus. Note that in a case that the terminal apparatus has not been able to receive the frame properly, the terminal apparatus does not transmit ACK. Thus, the base station apparatus ends the communication on the assumption that the communication has been failed in a case that the ACK frame has not been received from the receiving station for a certain period (SIFS+ACK frame length) after the frame transmission. In this manner, end of single communication (also called a burst) of the IEEE 802.11 system is always determined based on whether the ACK frame has been received except for special cases such as a case of transmission of a broadcast signal such as a beacon frame and a case that fragmentation for splitting transmission data is used.

In a case that the terminal apparatus determines that the received transmission frame is not destined to the terminal apparatus, the terminal apparatus configures a Network allocation vector (NAV) based on the Length of the transmission frame stated in the PHY header or the like. The terminal apparatus does not attempt communication during a period configured in the NAV. In other words, because the terminal apparatus performs the same operation as in a case that the physical CS determines that the radio channel is in the busy state for a period configured in the NAV, the communication control based on the NAV is also called virtual carrier sense (virtual CS). The NAV is also configured by a Request to send (RTS) frame and a reception preparation completion (Clear to send (CTS)) frame, which are introduced to solve a hidden terminal problem in addition to the case that the NAV is configured based on the information stated in the PHY header.

Compared to the DCF in which each apparatus performs carrier sense and autonomously acquires a transmission right, the PCF controls a transmission right of each apparatus inside the BSS using a control station called a Point coordinator (PC). In general, the base station apparatus serves as a PC and acquires a transmission right of the terminal apparatus inside the BSS.

A communication period using the PCF includes a Contention free period (CFP) and a Contention period (CP). During the CP, communication is performed based on the aforementioned DCF, and the PC controls the transmission right during the CFP. The base station apparatus being a PC broadcasts a beacon frame with description of a CFP period (CFP Max duration) and the like in the BSS prior to a communication using the PCF. Note that the PIFS is used to transmit the beacon frame broadcast at the time of a start of transmission using the PCF, and the beacon frame is transmitted without waiting for CW. The terminal apparatus that has received the beacon frame configures the period of CFP stated in the beacon frame to the NAV. Thereafter, the terminal apparatus can acquire the transmission right only in a case that a signal (a data frame including CF-poll, for example) that performs signaling an acquisition of a transmission right transmitted by the PC is received, until the NAV elapses or a signal (a data frame including CF-end, for example) that broadcasts the end of the CFP in the BSS is received. Note that, because no packet collision occurs inside the same BSS during the CFP period, each terminal apparatus does not take a random backoff time used in the DCF.

Figure 4:
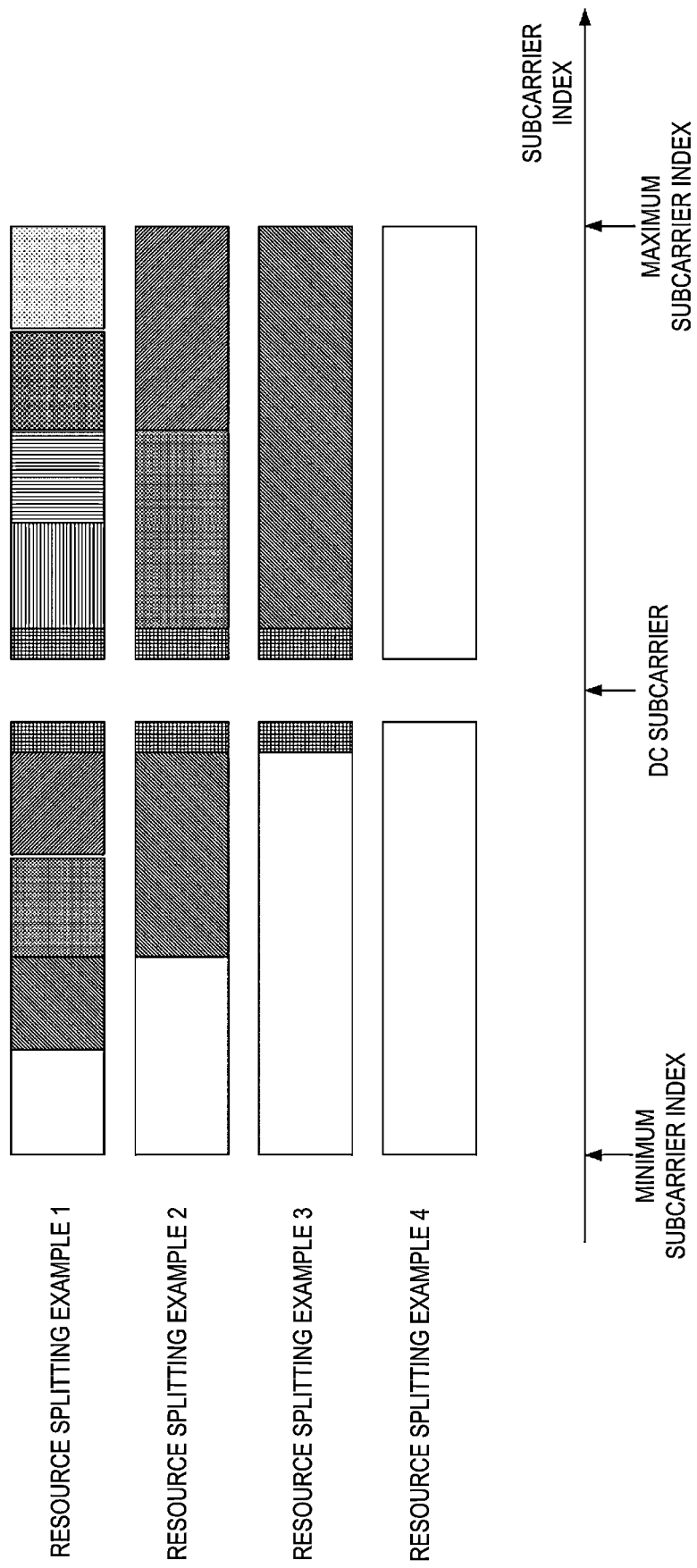
FIG. 4 is an overview diagram illustrating examples of splitting a radio medium according to an aspect of the present invention.

The radio medium can be split into multiple Resource units (RUs). FIG. 4 is an overview diagram illustrating an example of a split state of a radio medium. In the resource splitting example 1, for example, the radio communication apparatus can split a frequency resource (subcarrier) being a radio medium into nine RUs. Similarly, in the resource splitting example 2, the radio communication apparatus can split a subcarrier being a radio medium into five RUs. It is a matter of course that each resource splitting example illustrated in FIG. 4 is just an example, and for example, each of the multiple RUs can include a different number of subcarriers. The radio medium split into RUs can include not only a frequency resource but also a spatial resource. The radio communication apparatus (AP, for example) can transmit frames to multiple terminal apparatuses (multiple STAs, for example) at the same time by mapping each of the frames destined to different one of the multiple terminal apparatuses to the respective one of the RUs. The AP can state information indicating the split state of the radio medium (Resource allocation information) as common control information in the PHY header of the frame transmitted by the AP. Moreover, the AP can state information indicating a RU where a frame destined to each STA is mapped (resource unit assignment information) as unique control information in the PHY header of the frame the AP transmits.

The multiple terminal apparatuses (multiple STAs, for example) can transmit frames at the same time by transmitting each frame mapped to each RU allocated to each of the multiple terminal apparatuses. The multiple STAs can perform frame transmissions after waiting for a prescribed period after receiving the frame (Trigger frame: TF) including trigger information transmitted from the AP. Each STA can recognize the RU allocated to the STA based on the information stated in the TF. Each STA can acquire the RU through a random access with reference to the TF.

The AP can allocate multiple RUs to one STA at the same time. Each of the multiple RUs can include continuous subcarriers or can include non-continuous subcarriers. The AP can transmit one frame using multiple RUs allocated to one STA or can transmit multiple frames with the frames allocated to different RUs. At least one of the multiple frames can be a frame including common control information for multiple terminal apparatuses that transmit Resource allocation information.

One STA can be allocated with multiple RUs by the AP. The STA can transmit one frame using the multiple allocated RUs. The STA can use the multiple allocated RUs to perform transmission of multiple frames allocated to mutually different RUs. The multiple frames can be frames of mutually different frame types.

The AP can allocate multiple Association IDs (AIDs) to one STA. The AP can allocate an RU to each of the multiple AIDs allocated to the one STA. The AP can transmit mutual different frames using each RU allocated to the respective one of the multiple AIDs allocated to the one STA. The different frames can be frames of mutually different frame types.

One STA can be allocated with multiple Associate IDs (AIDs) by the AP. For one STA, an RU can be allocated to each of the multiple allocated AIDs. One STA can recognize all of the RUs allocated to the multiple AIDs allocated to the STA as RUs allocated to the STA and can transmit one frame using the multiple allocated RUs. One STA can transmit multiple frames using the multiple allocated RUs. At this time, each of the multiple frames can be transmitted with information indicating an AID associated with the respective one of the allocated RUs stated therein. The AP can transmit mutual different frames using each of the RUs allocated to the respective one of the multiple AIDs allocated to the one STA. The different frames can be frames of different frame types.

Hereinafter, the base station apparatus and the terminal apparatuses will be collectively referred to as radio communication apparatuses or communication apparatuses. Information exchanged in a case that a certain radio communication apparatus performs communication with another radio communication apparatus will also be referred to as data. In other words, the radio communication apparatus includes the base station apparatus and the terminal apparatuses.

The radio communication apparatus includes either or both of a function of transmitting a PPDU and a function of receiving a PPDU. FIG. 1 is a diagram illustrating an example of a PPDU configuration transmitted by the radio communication apparatus. The PPDU that is compliant with the IEEE 802.11a/b/g standard includes L-STF, L-LTF, L-SIG, and a Data frame (a MAC Frame, a MAC frame, a payload, a data part, data, information bits, and the like). The PPDU that is compliant with the IEEE 802.11n standard includes L-STF, L-LTF, L-SIG, HT-SIG, HT-STF, HT-LTF, and a Data frame. The PPDU that is compliant with the IEEE 802.11ac standard includes some or all of L-STF, L-LTF, L-SIG, VHT-SIG-A, VHT-STF, VHT-LTF, VHT-SIG-B, and a MAC frame. The PPDU studied in the IEEE 802.11ax standard includes some or all of L-STF, L-LTF, L-SIG, RL-SIG in which L-SIG is temporally repeated, HE-SIG-A, HE-STF, HE-LTF, HE-SIG-B, and a Data frame. The PPDU studied in the IEEE 802.11be standard includes some or all of L-STF, L-LTF, L-SIG, RL-SIG, U-SIG, EHT-SIG, EHT-STF, HET-LTF, and a Data frame.

L-STF, L-LTF, and L-SIG surrounded by a dotted line in FIG. 1 are configurations commonly used in the IEEE 802.11 standard (hereinafter, L-STF, L-LTF, and L-SIG will also be collectively referred to as an L-header). For example, a radio communication apparatus that is compliant with the IEEE 802.11a/b/g standard can appropriately receive an L-header inside a PPDU that is compliant with the IEEE 802.11n/ac standard. The radio communication apparatus that is compliant with the IEEE 802.11a/b/g standard can receive the PPDU that is compliant with the IEEE 802.11n/ac standard while considering it as a PPDU that is compliant with the IEEE 802.11a/b/g standard.

Note that, because the radio communication apparatus that is compliant with the IEEE 802.11a/b/g standard cannot demodulate the PPDU that is compliant with the IEEE 802.11n/ac standard following the L-header, it is not possible to demodulate information related to a Transmitter Address (TA), a Receiver Address (RA), and a Duration/ID field used for configuring the NAV.

As a method for the radio communication apparatus that is compliant with the IEEE 802.11a/b/g standard to appropriately configure the NAV (or perform a receiving operation for a prescribed period), IEEE 802.11 defines a method of inserting Duration information into the L-SIG. Information related to a transmission speed in the L-SIG (a RATE field, an L-RATE field, an L-RATE, an L_DATARATE, and an L_DATARATE field), information related to a transmission period (a LENGTH field, an L-LENGTH field, and an L-LENGTH) are used by the radio communication apparatus that is compliant with the IEEE 802.11a/b/g standard to appropriately configure the NAV.

Figure 2:
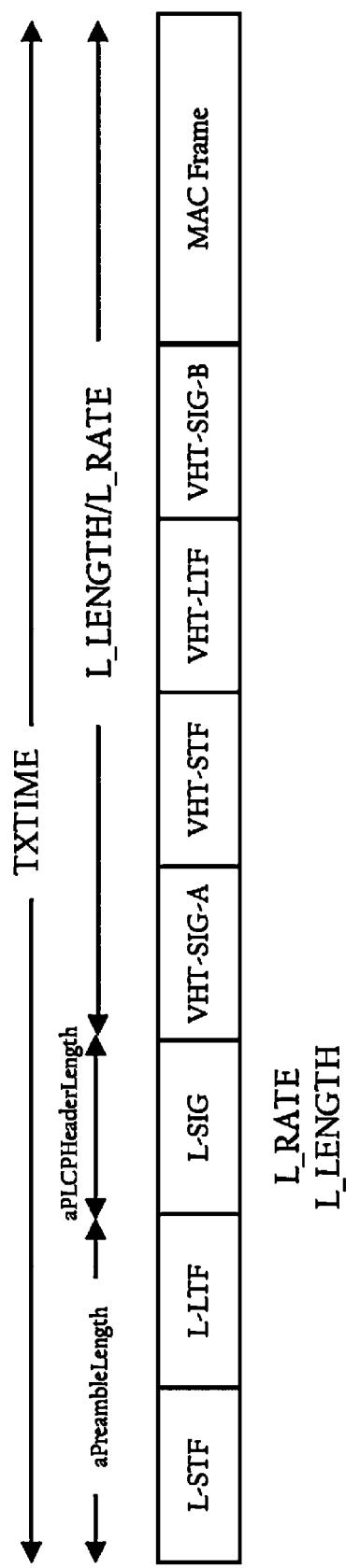
FIG. 2 is a diagram illustrating an example of the frame configuration according to an aspect of the present invention.

FIG. 2 is a diagram illustrating an example of a method of Duration information inserted into the L-SIG. Although a PPDU configuration that is compliant with the IEEE 802.11ac standard is illustrated as an example in FIG. 2, the PPDU configuration is not limited thereto. A PPDU configuration that is compliant with the IEEE 802.11n standard and a PPDU configuration that is compliant with the IEEE 802.11ax standard may be employed. TXTIME includes information related to the length of the PPDU, aPreambleLength includes information related to the length of a preamble (L-STF+L-LTF), and aPLCPHeaderLength includes information related to the length of a PLCP header (L-SIG). L_LENGTH is calculated based on Signal Extension that is a virtual period configured for compatibility with the IEEE 802.11 standard, $N_{ops}$ related to L-RATE, aSymbolLength that is information related to one symbol (a symbol, an OFDM symbol, or the like), aPLCPServiceLength indicating the number of bits included in PLCP Service field, and aPLCPConvolutionalTailLength indicating the number of tail bits of a convolution code. The radio communication apparatus can calculate L_LENGTH and insert L_LENGTH into L-SIG. The radio communication apparatus can calculate L-SIG Duration. L-SIG Duration indicates information related to a PPDU including L_LENGTH and information related to a period that is the sum of periods of Ack and SIFS expected to be transmitted by the destination radio communication apparatus in response to the PPDU.

Figure 3:
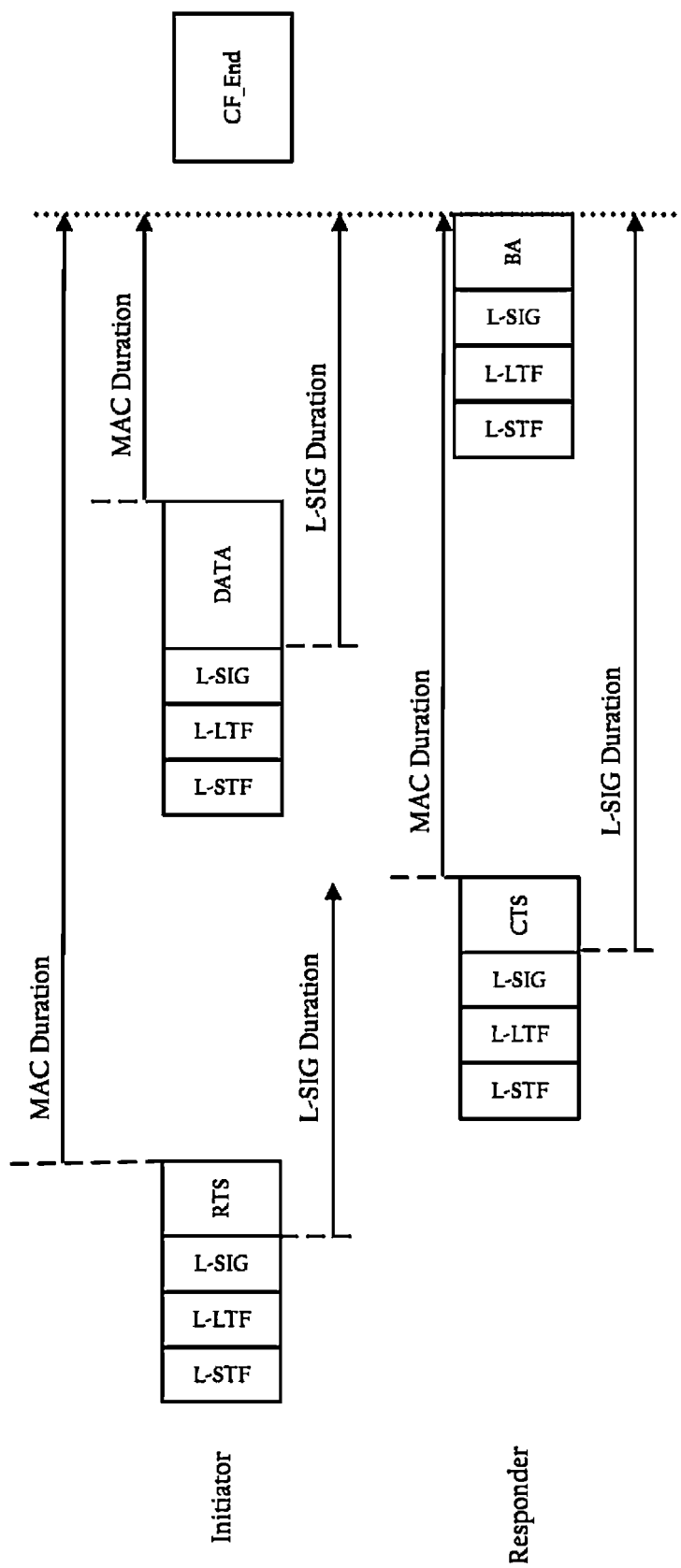
FIG. 3 is a diagram illustrating an example of communication according to an aspect of the present invention.

FIG. 3 is a diagram illustrating an example of L-SIG Duration in L-SIG TXOP Protection. DATA (a frame, a payload, data, and the like) include a part of or both the MAC frame and the PLCP header. BA is Block Ack or Ack. The PPDU includes L-STF, L-LTF, and L-SIG and can further include any one or more of DATA, BA, RTS, and CTS. Although L-SIG TXOP Protection using RTS/CTS is illustrated in the example illustrated in FIG. 3, CTS-to-Self may be used. Here, MAC Duration is a period indicated by a value of Duration/ID field. Initiator can transmit a CF_End frame for notifying an end of the L-SIG TXOP Protection period.

Next, a method of identifying a BSS from a frame received by a radio communication apparatus will be described. In order for the radio communication apparatus to identify the BSS from the received frame, the radio communication apparatus that transmits a PPDU preferably inserts information (BSS color, BSS identification information, a value unique to the BSS) for identifying the BSS into the PPDU. Information indicating the BSS color can be stated in HE-SIG-A.

The radio communication apparatus can transmit L-SIG multiple times (L-SIG Repetition). For example, demodulation accuracy of L-SIG is improved by the radio communication apparatus on the recipient receiving L-SIG transmitted multiple times by using Maximum Ratio Combining (MRC). Moreover, in a case that reception of L-SIG has properly been completed using MRC, the radio communication apparatus can interpret the PPDU including the L-SIG as a PPDU that is compliant with the IEEE 802.11ax standard.

Even during the operation of receiving the PPDU, the radio communication apparatus can perform an operation of receiving a part of a PPDU other than the PPDU (such as a preamble, L-STF, L-LTF, and a PLCP header defined by IEEE 802.11, for example) (also referred to as a dual-reception operation). In a case that, during the operation of receiving the PPDU, a part of a PPDU other than the PPDU is detected, the radio communication apparatus can update a part or an entirety of information related to a destination address, a source address, the PPDU, or a DATA period.

Ack and BA can also be referred to as a response (response frame). A probe response, an authentication response, and a connectivity response can also be referred to as a response.

1. First Embodiment

Figure 5:
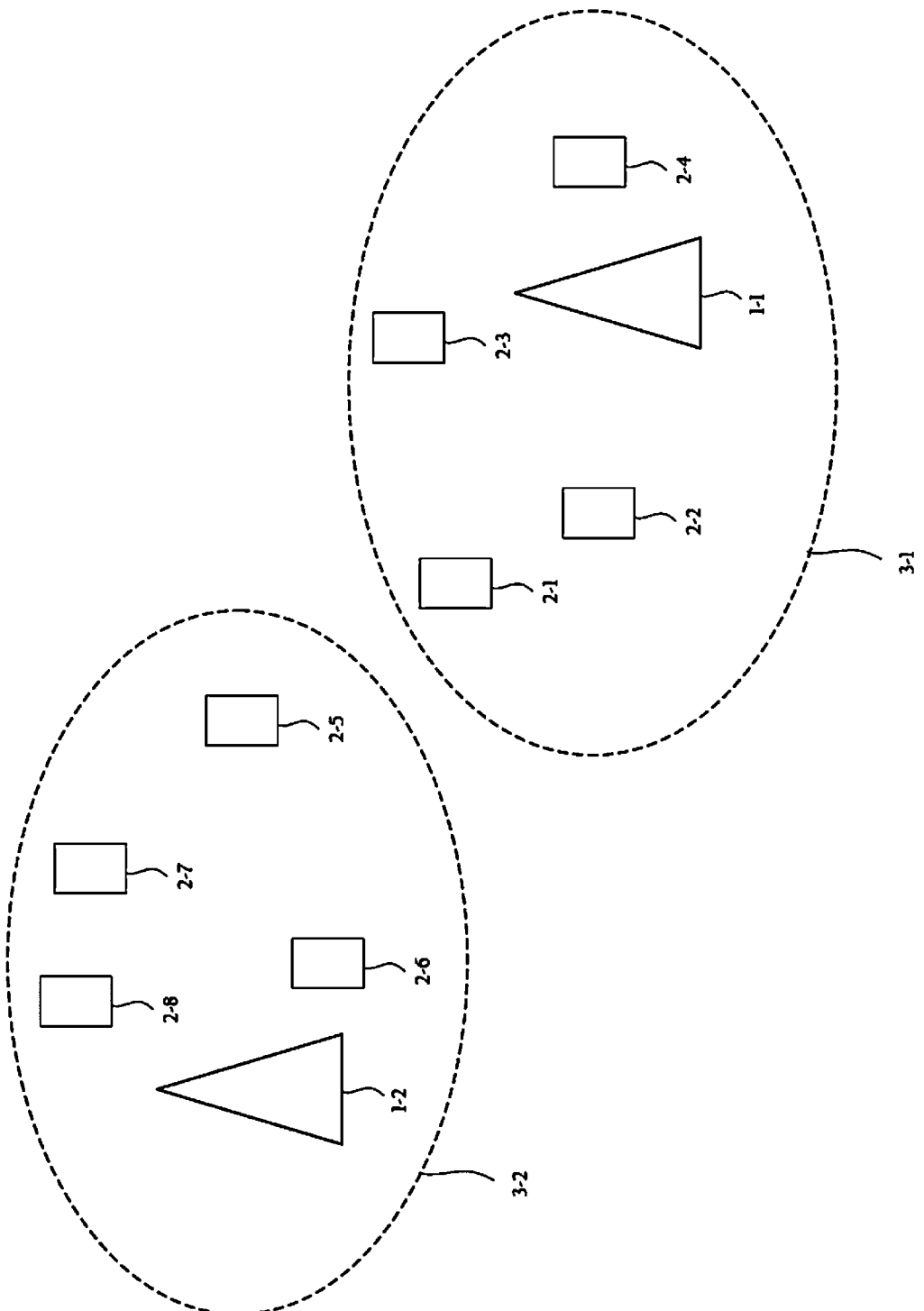
FIG. 5 is a diagram illustrating a configuration example of a communication system according to an aspect of the present invention.

FIG. 5 is a diagram illustrating an example of a radio communication system according to the present embodiment. A radio communication system 3-1 includes a radio communication apparatus 1-1 and radio communication apparatuses 2-1 to 2-4. Note that the radio communication apparatus 1-1 will also be referred to as a base station apparatus 1-1, and the radio communication apparatuses 2-1 to 2-4 will also be referred to as terminal apparatuses 2-1 to 2-4. The radio communication apparatuses 2-1 to 2-4 and the terminal apparatuses 2-1 to 2-4 will also be referred to as a radio communication apparatus 2A and a terminal apparatus 2A, respectively, as apparatuses connected to the radio communication apparatus 1-1. The radio communication apparatus 1-1 and the radio communication apparatus 2A are wirelessly connected and are in a state in which they can transmit and/or receive PPDUs to and from each other. The radio communication system according to the present embodiment includes a radio communication system 3-2 in addition to the radio communication system 3-1. The radio communication system 3-2 includes a radio communication apparatus 1-2 and radio communication apparatuses 2-5 to 2-8. Note that the radio communication apparatus 1-2 will also be referred to as a base station apparatus 1-2 and the radio communication apparatuses 2-5 to 2-8 will also be referred to as terminal apparatuses 2-5 to 2-8. The radio communication apparatuses 2-5 to 2-8 and the terminal apparatuses 2-5 to 2-8 will also be referred to as a radio communication apparatus 2B and a terminal apparatus 2B, respectively, as apparatuses connected to the radio communication apparatus 1-2. Although the radio communication system 3-1 and the radio communication system 3-2 form different BSSs, this does not necessarily mean that Extended Service Sets (ESSs) are different. The ESSs indicate service sets forming a Local Area Network (LAN). In other words, radio communication apparatuses belonging to the same ESS can be considered to be belonging to the same network from a higher layer. Note that each of the radio communication systems 3-1 and 3-2 can further include multiple radio communication apparatuses.

In FIG. 5, it is assumed that signals transmitted by the radio communication apparatus 2A reach the radio transmitting apparatus 1-1 and the radio communication apparatus 2B while the signals do not reach the radio communication apparatus 1-2 in the following description. In other words, in a case that the radio communication apparatus 2A transmits a signal using a certain channel, the radio communication apparatus 1-1 and the radio communication apparatus 2B determine that the channel is in the busy state while the radio communication apparatus 1-2 determines that the channel is in an idle state. It is assumed that signals transmitted by the radio communication apparatus 2B reach the radio communication apparatus 1-2 and the radio communication apparatus 2A while the signals do not reach the radio communication apparatus 1-1. In other words, in a case that the radio communication apparatus 2B transmits a signal using a certain channel, the radio communication apparatus 1-2 and the radio communication apparatus 2A determine that the channel is in the busy state while the radio communication apparatus 1-1 determines that the channel is in the idle state.

Figure 6:
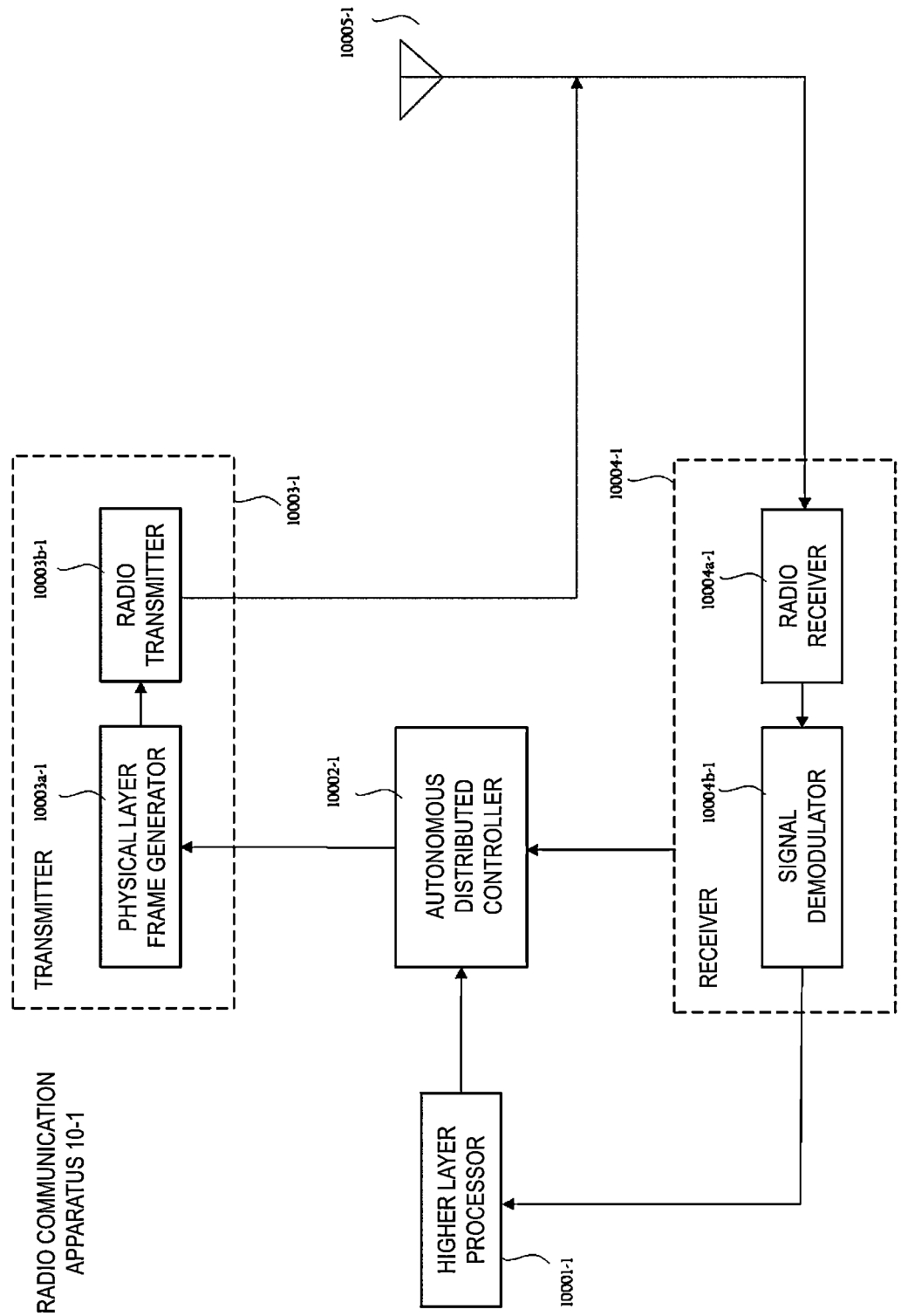
FIG. 6 is a block diagram illustrating a configuration example of a radio communication apparatus according to an aspect of the present invention.

FIG. 6 is a diagram illustrating an example of an apparatus configuration of radio communication apparatuses 1-1, 1-2, 2A, and 2B (hereinafter, collectively referred to as a radio communication apparatus 10-1 or a station apparatus 10-1 or also simply referred to as a station apparatus). The radio communication apparatus 10-1 includes a higher layer processor (higher layer processing step) 10001-1, an autonomous distributed controller (autonomous distributed control step) 10002-1, a transmitter (transmission step) 10003-1, a receiver (reception step) 10004-1, and an antenna unit 10005-1.

The higher layer processor 10001-1 is connected with another network to be able to notify the autonomous distributed controller 10002-1 of information related to a traffic. The information related to the traffic may be, for example, information destined for other radio communication apparatuses, or may be control information included in the management frame or control frame.

Figure 7:
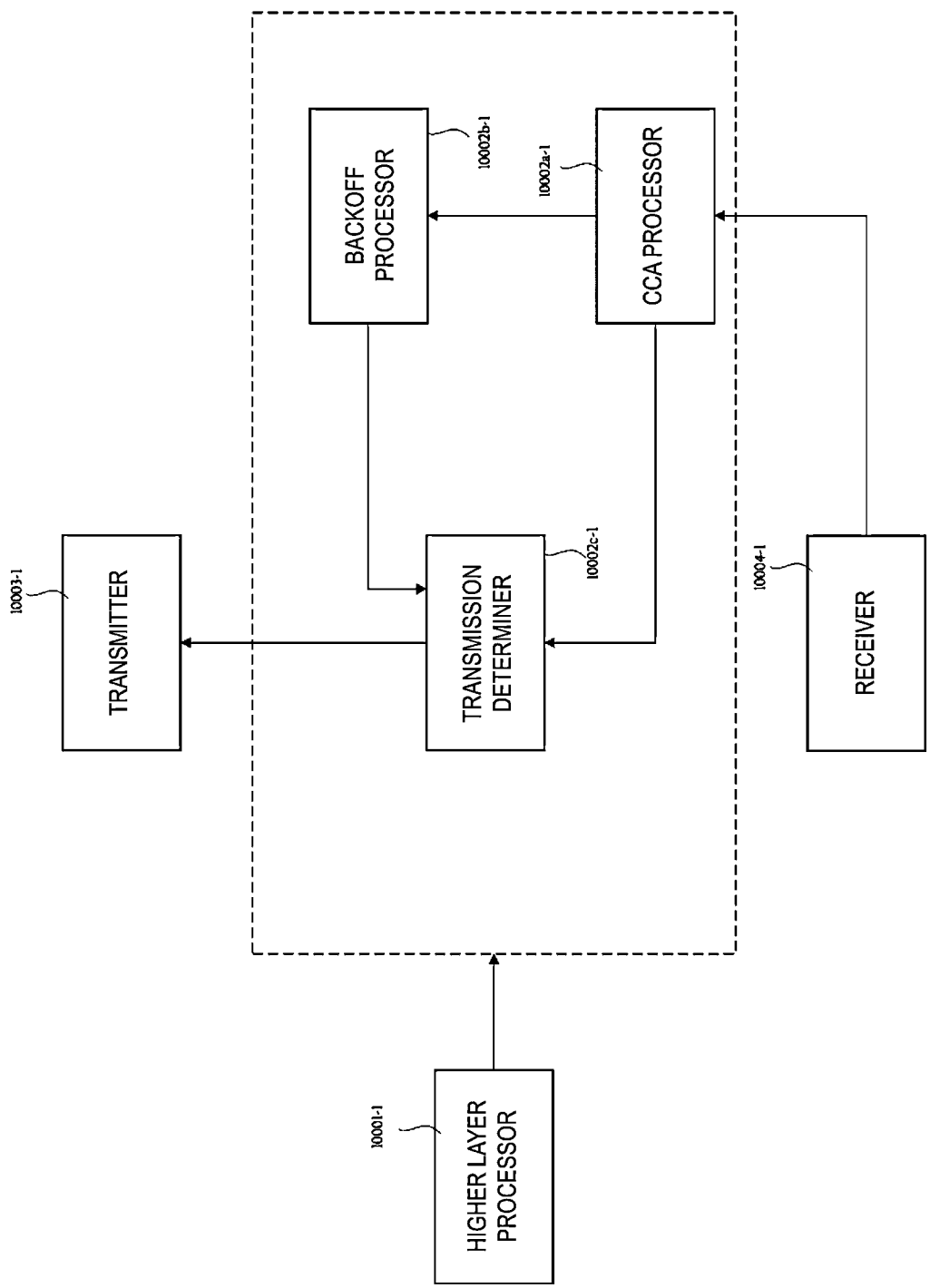
FIG. 7 is a block diagram illustrating a configuration example of a radio communication apparatus according to an aspect of the present invention.

FIG. 7 is a diagram illustrating an example of an apparatus configuration of the autonomous distributed controller 10002-1. The autonomous distributed controller 10002-1 includes a CCA processor (CCA step) 10002*a*-1, a backoff processor (backoff step) 10002*b*-1, and a transmission determiner (transmission determination step) 10002*c*-1.

The CCA processor 10002*a*-1 can perform determination of a state of a radio resource (including determination between busy and idle) by using either one of or both information related to reception signal power received via the radio resource and information related to the reception signal (including information after decoding) notified from the receiver. The CCA processor 10002*a*-1 can notify the backoff processor 10002*b*-1 and the transmission determiner 10002*c*-1 of the state determination information of the radio resource.

The backoff processor 10002*b*-1 can perform backoff by using the state determination information of the radio resource. The backoff processor 10002*b*-1 generates CW and includes a counting-down function. For example, it is possible to perform counting-down of CW in a case that the state determination information of the radio resource indicates idle, and it is possible to stop the counting-down of CW in a case that the state determination information of the radio resource indicates busy. The backoff processor 10002*b*-1 can notify the transmission determiner 10002*c*-1 of the value of CW.

The transmission determiner 10002*c*-1 performs transmission determination by using either one of or both the state determination information of the radio resource and the value of CW. For example, it is possible to notify the transmitter 10003-1 of transmission determination information in a case that the state determination information of the radio resource indicates idle and the value of CW is zero. It is possible to notify the transmitter 10003-1 of the transmission determination information in a case that the state determination information of the radio resource indicates idle.

The transmitter 10003-1 includes a physical layer frame generator (physical layer frame generation step) 10003*a*-1 and a radio transmitter (radio transmission step) 10003*b*-1. The physical layer frame generator 10003*a*-1 includes a function of generating a physical layer frame (PPDU) based on the transmission determination information notified from the transmission determiner 10002*c*-1. The physical layer frame generator 10003*a*-1 performs error correction coding, modulation, precoding filter multiplication, and the like on the transmission frame transmitted from the higher layer. The physical layer frame generator 10003*a*-1 notifies the radio transmitter 10003*b*-1 of the generated physical layer frame.

Figure 8:
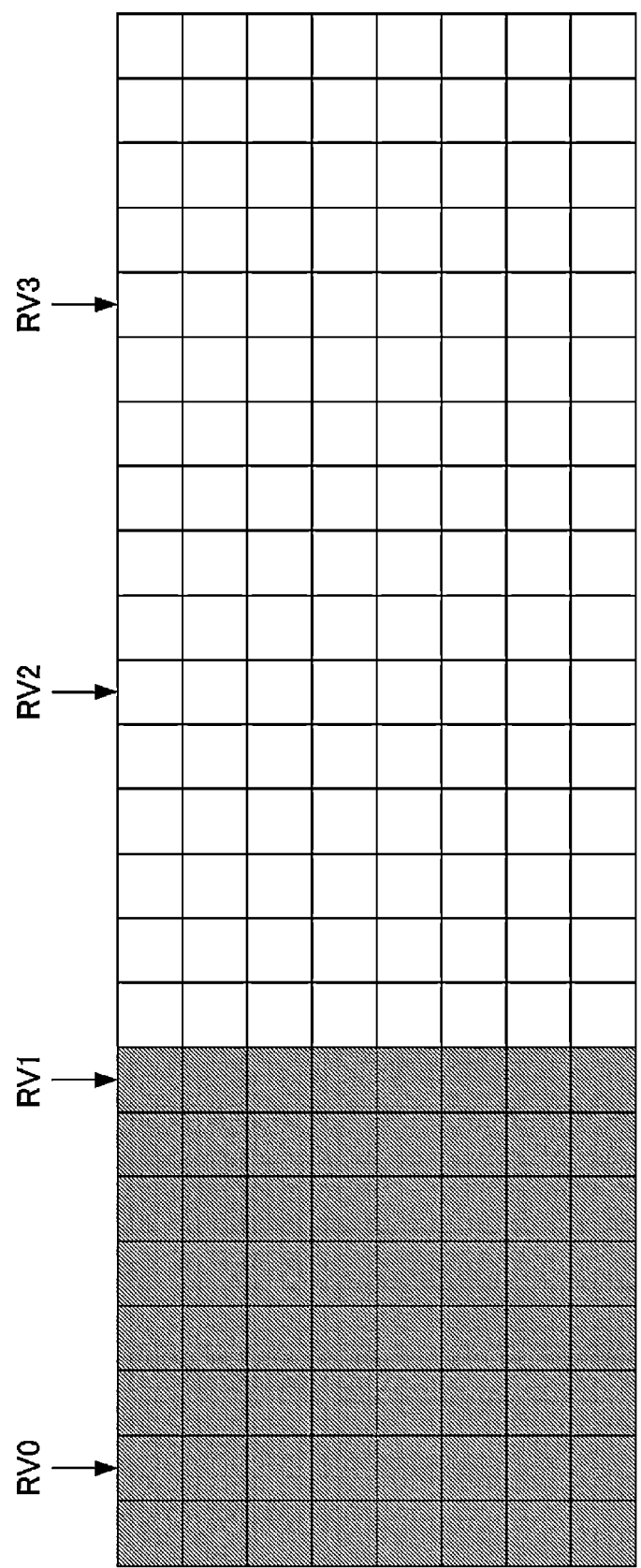
FIG. 8 is an overview diagram illustrating an example of a coding scheme according to an aspect of the present invention.

FIG. 8 is a diagram illustrating an example of error correction coding by the physical frame generator according to the present embodiment. As illustrated in FIG. 8, an information bit (systematic bit) sequence is mapped in the hatched region and a redundancy (parity) bit sequence is mapped in the white region. For each of the information bit and the redundancy bit, a bit interleaver is appropriately applied. The physical frame generator can read a necessary number of bits as a start position determined for the mapped bit sequence in accordance with a value of Redundancy Version (RV). It is possible to achieve a flexible change in coding rate, that is puncturing, through adjustment of the number of bits. Note that although a total of four RVs are illustrated in FIG. 8, the number of options for RV is not limited to a specific value in the error correction coding according to the present embodiment. The position of the RV has to be shared among the station apparatuses.

The physical layer frame generator performs error correction coding for the information bits transferred from the MAC layer, but a unit for error correction coding (coding block length) is not limited to anything. For example, the physical layer frame generator may split the information bit sequence transferred from the MAC layer into information bit sequences of a prescribed length, and perform error correction coding on the respective sequences to configure multiple coding blocks. Note that dummy bits can be inserted into the information bit sequence transferred from the MAC layer in configuring the coding block.

The frame generated by the physical layer frame generator 10003*a*-1 includes control information. The control information includes information indicating data destined for each radio communication apparatus is mapped to which RU (here, the RU includes both frequency resources and spatial resources). The frame generated by the physical layer frame generator 10003*a*-1 includes a trigger frame for providing an indication of frame transmission to the radio communication apparatus being a destination terminal. The trigger frame includes information indicating the RU used in a case that the radio communication apparatus that has received the indication of the frame transmission transmits the frame.

The radio transmitter 10003*b*-1 converts the physical layer frame generated by the physical layer frame generator 10003*a*-1 into a signal in a Radio Frequency (RF) band to generate a radio frequency signal. Processing performed by the radio transmitter 10003*b*-1 includes digital-to-analog conversion, filtering, frequency conversion from a baseband to an RF band, and the like.

The receiver 10004-1 includes a radio receiver (radio receiving step) 10004*a*-1 and a signal demodulator (signal demodulation step) 10004*b*-1. The receiver 10004-1 generates information related to reception signal power from the signal in the RF band received by the antenna unit 10005-1. The receiver 10004-1 can notify the CCA processor 10002*a*-1 of the information related to the reception signal power and the information related to the reception signal.

The radio receiver 10004*a*-1 includes a function of converting the signal in the RF band received by the antenna unit 10005-1 into a baseband signal and generating a physical layer signal (for example, a physical layer frame). Processing performed by the radio receiver 10004*a*-1 includes frequency conversion processing from the RF band to the baseband, filtering, and analog-to-digital conversion.

The signal demodulator 10004*b*-1 includes a function of demodulating the physical layer signal generated by the radio receiver 10004*a*-1. Processing performed by the signal demodulator 10004*b*-1 includes channel equalization, demapping, error correction decoding, and the like. The signal demodulator 10004*b*-1 can extract, from the physical layer signal, information included in the physical layer header, information included in the MAC header, and information included in the transmission frame, for example. The signal demodulator 10004*b*-1 can notify the higher layer processor 10001-1 of the extracted information. Note that the signal demodulator 10004*b*-1 can extract any one or all of information included in the physical layer header, information included in the MAC header, and information included in the transmission frame.

The antenna unit 10005-1 includes a function of transmitting the radio frequency signal generated by the radio transmitter 10003*b*-1 to a radio space toward a radio apparatus 0-1. The antenna unit 10005-1 includes a function of receiving the radio frequency signal transmitted from the radio apparatus 0-1.

The radio communication apparatus 10-1 can cause radio communication apparatuses in the surroundings of the radio communication apparatus 10-1 to configure NAV corresponding to a period during which the radio communication apparatus 10-1 uses a radio medium by stating information indicating the period in the PHY header or the MAC header of the frame to be transmitted. For example, the radio communication apparatus 10-1 can state the information indicating the period in a Duration/ID field or a Length field in the frame to be transmitted. The NAV period configured to radio communication apparatuses in the surroundings of the radio communication apparatus 10-1 will be referred to as a TXOP period (or simply TXOP) acquired by the radio communication apparatus 10-1. The radio communication apparatus 10-1 that has acquired the TXOP will be referred to as a TXOP holder. The frame type of frame to be transmitted by the radio communication apparatus 10-1 to acquire TXOP is not limited to any frame type, and the frame may be a control frame (for example, an RTS frame or a CTS-to-self frame) or may be a data frame.

The radio communication apparatus 10-1 that is a TXOP holder can transmit the frame to radio communication apparatuses other than the radio communication apparatus 10-1 during the TXOP. In a case that the radio communication apparatus 1-1 is a TXOP holder, the radio communication apparatus 1-1 can transmit a frame to the radio communication apparatus 2A during the TXOP period. The radio communication apparatus 1-1 can provide an indication of frame transmission destined to the radio communication apparatus 1-1 to the radio communication apparatus 2A during the TXOP period. The radio communication apparatus 1-1 can transmit, to the radio communication apparatus 2A, a trigger frame including information for providing the indication of the frame transmission destined to the radio communication apparatus 1-1 during the TXOP period.

The radio communication apparatus 1-1 may ensure the TXOP for the entire communication band (an Operation bandwidth, for example) that may be used for the frame transmission, or may ensure the TXOP for a specific communication Band such as a communication band actually used to transmit the frame (a Transmission bandwidth, for example).

The radio communication apparatus to which the radio communication apparatus 1-1 provides an indication of frame transmission in the acquired TXOP period is not necessarily limited to radio communication apparatuses connected to the radio communication apparatus 1-1. For example, the radio communication apparatus can provide an indication for transmitting frames to radio communication apparatuses that are not connected to the former radio communication apparatus in order to cause the radio communication apparatuses in the surroundings of the former radio communication apparatus to transmit management frames such as a Reassociation frame or control frames such as an RTS/CTS frame.

In the present embodiment, the signal demodulator of the station apparatus can perform decoding processing and perform error detection on a received signal in the physical layer. Here, the decoding processing includes decoding processing on an error correction code applied to the received signal. Here, the error detection includes error detection using an error detection code that has been pre-applied to the received signal (e.g., a cyclic redundancy check (CRC) code), and error detection using an error correction code originally having an error detection function (e.g., a low density parity check code (LDPC). The decoding processing in the physical layer can be applied per coding block.

The higher layer processor transfers a result of decoding the physical layer in the signal demodulator to the MAC layer. In the MAC layer, the signal for the MAC layer is restored from the transferred result of decoding the physical layer. Then, in the MAC layer, error detection is performed to determine whether the signal for the MAC layer transmitted by the transmission source station apparatus of the reception frame is correctly restored.

Figure 9:
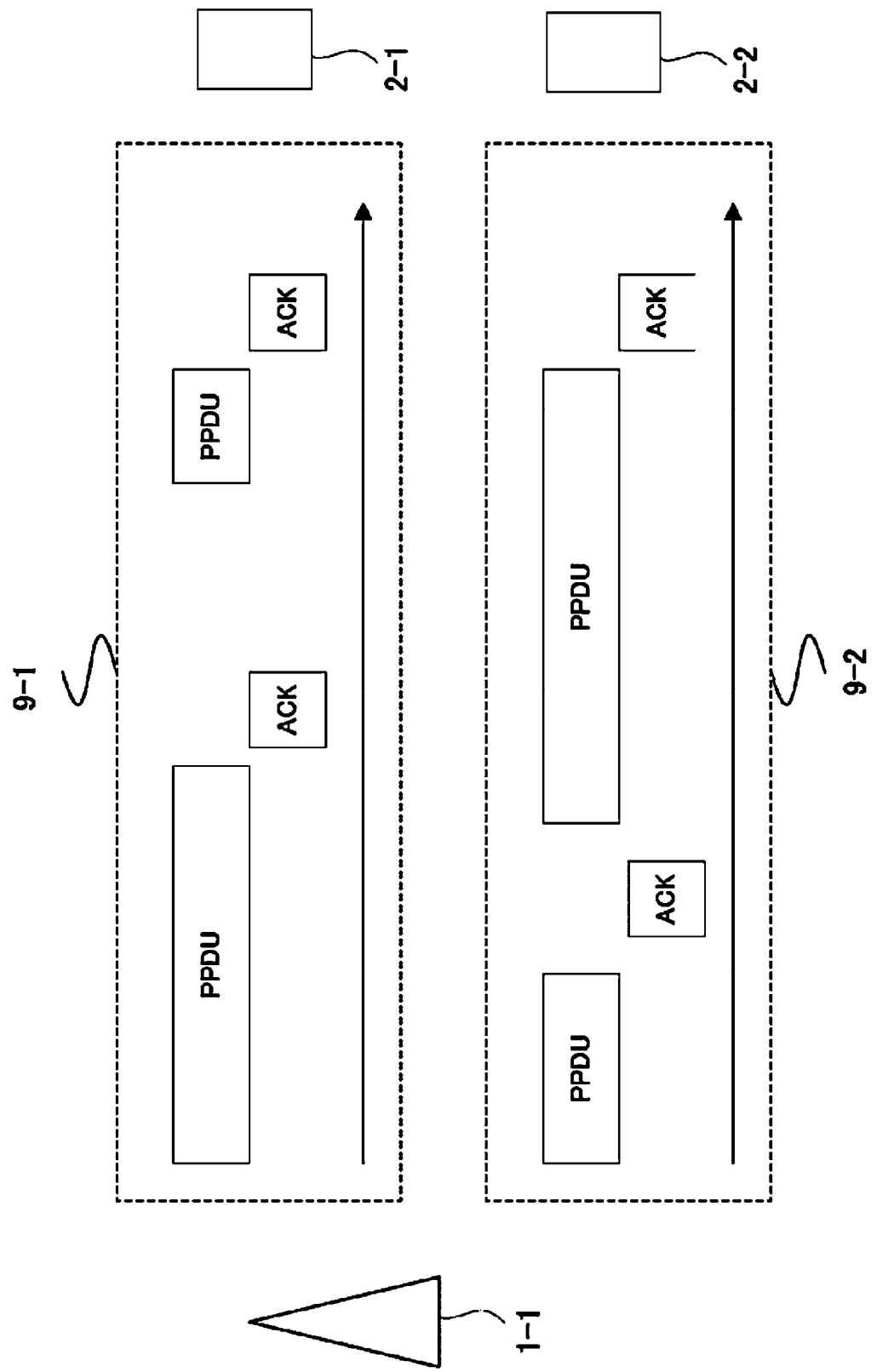
FIG. 9 is a diagram illustrating an example of communication according to an aspect of the present invention.

The communication apparatus according to the present embodiment can maintain multiple connections (links). Here, "maintaining the connections" means that a frame can be transmitted and/or received based on a prescribed configuration. FIG. 9 is an overview diagram illustrating a way of communication according to the present embodiment. As illustrated in FIG. 9, an access point apparatus 1-1 according to the present embodiment can maintain a connection between a station apparatus 2-1 and a station apparatus 2-2 by using carrier frequencies different from each other. For example, the access point apparatus 1-1 according to the present embodiment can configure a 2.4 GHz band frequency for a connection 9-1 with the station apparatus 2-1 and configure a 5 GHz band frequency for a connection 9-2 with the station apparatus 2-2.

Figure 10:
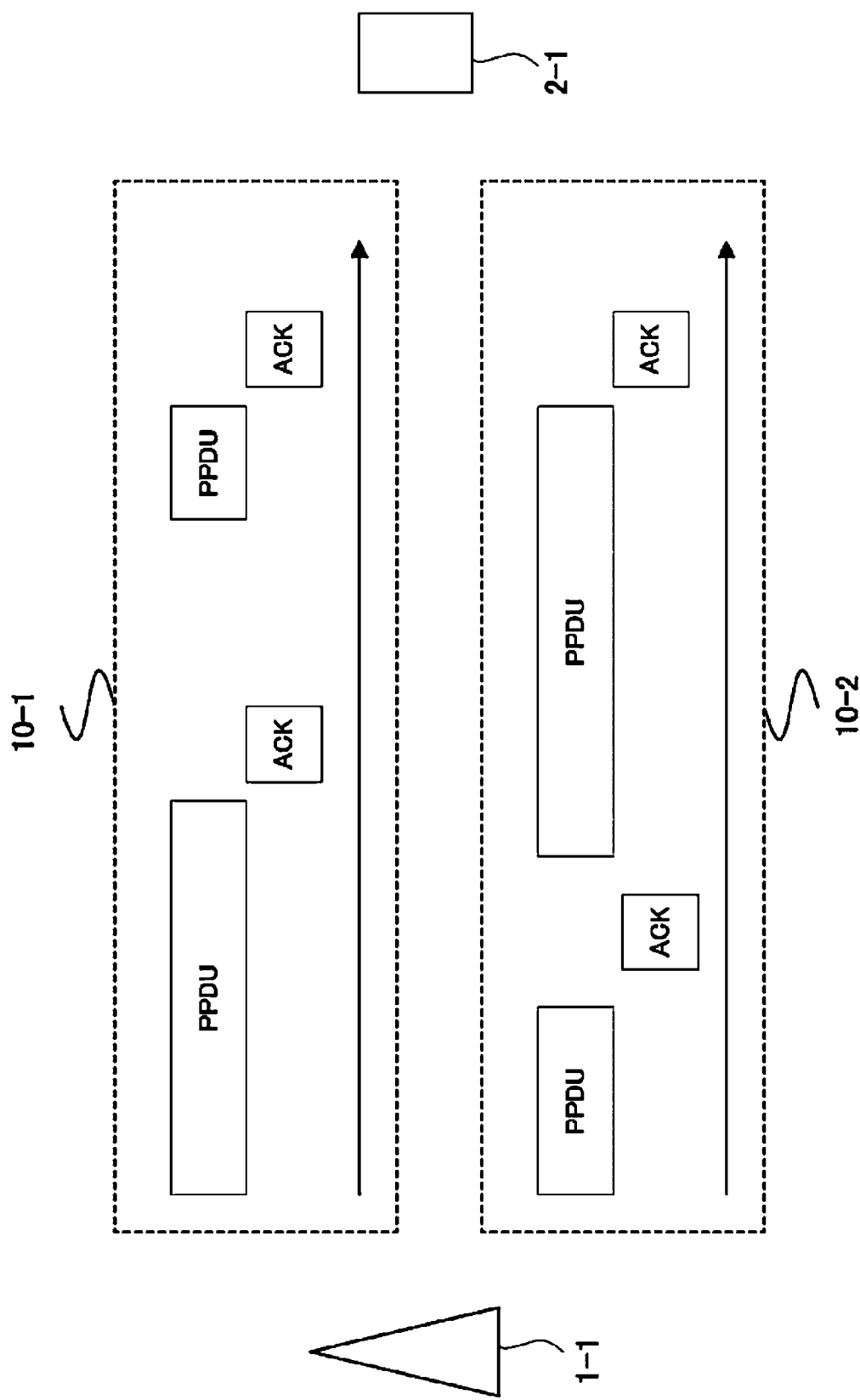
FIG. 10 is a diagram illustrating an example of communication according to an aspect of the present invention.

FIG. 10 is an overview diagram illustrating a way of communication according to the present embodiment. As illustrated in FIG. 10, the access point apparatus 1-1 according to the present embodiment can maintain two connections for the station apparatus 2-1. For example, the 2.4 GHz band frequency can be configured for a connection 10-1 and the 5 GHz band frequency can be configured for a connection 10-2. The configurations in this way allow the access point apparatus 1-1 to perform frame exchange with the station apparatus 2-1 by using those two frequencies.

The communication apparatus according to the present embodiment in a case of maintaining multiple connections can independently perform the frame exchange in the respective connections. This means that, in a case that a frame transmission is performed in one connection, a frame reception may be performed in another connection depending on the communication state of each connection. Therefore, this also means that the communication apparatus needs to support Simultaneously Transmission and Reception (STR) in which the frame transmission and the frame reception are performed at the same time. However, not all communication apparatuses can support the STR. Therefore, the communication apparatus needs to appropriately perform communication in accordance with whether or not the communication apparatus and other communication apparatuses support the STR. The communication apparatus according to the present embodiment can change the communication method depending on whether connection destinations of multiple connections the communication apparatus maintains are an identical communication apparatus or different communication apparatus.

Figure 11:
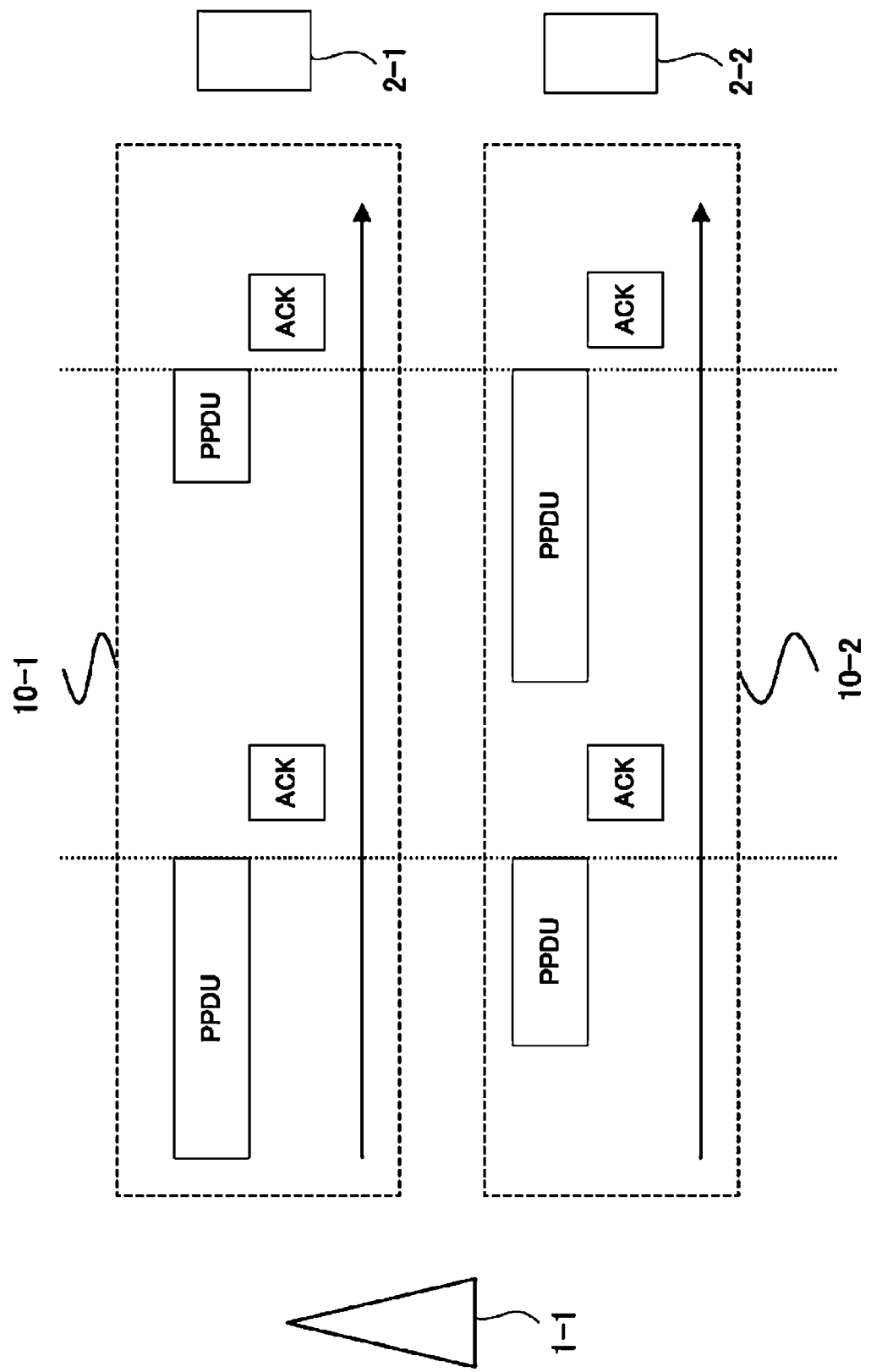
FIG. 11 is a diagram illustrating an example of communication according to an aspect of the present invention.

The communication apparatus according to the present embodiment determines whether the connection destinations of the multiple connections the communication apparatus maintains are either an identical communication apparatus or different communication apparatus, and configures a frame length of a frame to be transmitted in each of the connections. FIG. 11 is an overview diagram illustrating a way of communication according to the present embodiment. As illustrated in FIG. 11, the access point apparatus according to the present embodiment configures the frame lengths such that the ends of the frames transmitted in the respective connections (frame ends) are simultaneously reached in a case that the connection destinations of the multiple connections the communication apparatus maintains are configured to be different. The configuration in this way allows the access point apparatus to simultaneously receive the response frames (the ACK frames, etc.) to be received from the respective station apparatuses, and eliminates necessity for the access point apparatus during the frame transmission in one connection to perform the frame reception in another connection.

Figure 12:
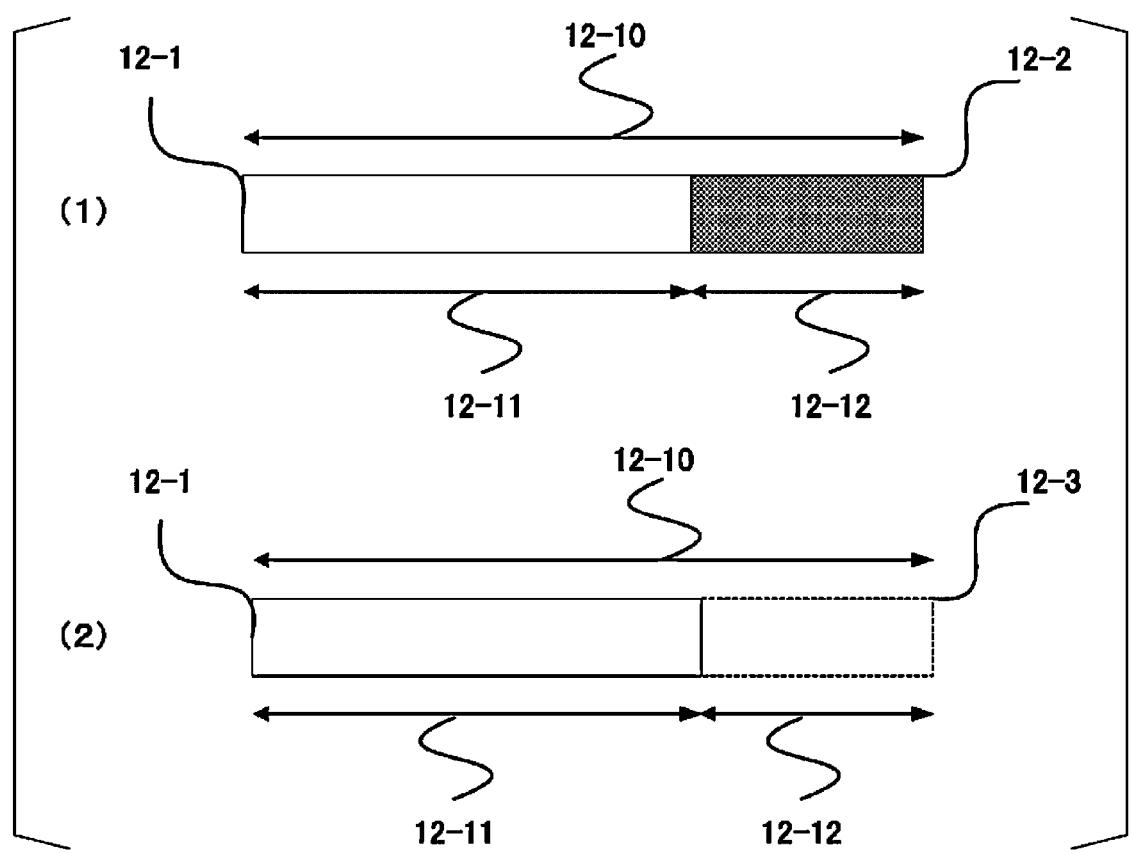
FIG. 12 is a diagram illustrating an example of communication according to an aspect of the present invention.

The access point apparatus can insert a dummy signal into the frame to configure the frame lengths in two connections. FIG. 12 is an overview diagram illustrating an example of a frame according to the present embodiment. As illustrated in FIG. 12(1), the access point apparatus can insert a dummy signal 12-2 into a transmission frame 12-1, and state, in the PHY header (or in the MAC header, or in the frame body) of the transmission frame, information indicating that the dummy signal 12-2 is inserted. At this time, the access point apparatus desirably notifies the station apparatus 2-1 of information associated with a period 12-11 or a period 12-12, while notifying the communication apparatus other than the station apparatus 2-1 of information associated with a period 12-10. For example, the access point apparatus can state the information associated with the period 12-11 or the period 12-12 in the EHT-SIG, while stating information associated with the period 12-10 in the L-SIG.

As illustrated in FIG. 12(2), the access point apparatus can insert a transmission gap 12-3 without actually inserting the dummy signal, and state information indicating the frame length assumed by the access point apparatus in the PHY header of the transmission frame 12-1. For example, the access point apparatus does not necessarily need to transmit the dummy signal 12-2 as long as the access point apparatus can state the information associated with the period 12-11 or the period 12-12 in the EHT-SIG, while stating information associated with the period 12-10 in the L-SIG. The configuration in this way allows the access point apparatus to suppress power consumption and to reduce the interference to the surrounding BSS. However, the communication apparatus that fails to correctly obtain the information indicating the period 12-12 may perform a frame transmission in the period 12-11. Thus, the access point apparatus in the case of inserting the transmission gap 12-3 into the frame can ensure the TXOP in advance by an RTS/CTS frame exchange.

The station apparatus according to the present embodiment, in a case of not being a destination of the transmission frame 12-1 illustrated in FIG. 12, and recognizing the period 12-12 and recognizing that the period 12-12 is the transmission gap 12-3, can perform the frame transmission in a part of the period 12-10 including the transmission gap 12-3 under a prescribed condition. The prescribed condition includes, for example, a case that the BSS to which the station apparatus belongs is different from the BSS to which the communication apparatus that transmitted the transmission frame belongs. This is because in this case, the station apparatus may be physically far from the communication apparatus that is the destination of the transmission frame 12-1, and thus the effect of the interference on each other is limited. The prescribed condition may also include a case that information indicating that the frame transmission in the transmission gap 12-3 is allowed is stated in the HET SIG of the transmission frame 12-1. Of course, in a case that information indicates that the frame transmission is prohibited, the frame transmission cannot be performed in the transmission gap 12-3. Note that, although the information indicating whether or not the frame transmission is allowed can be stated in the PHY header of the transmission frame 12-1, information associated with other connections can be stated in the PHY header of the transmission frame 12-1, in addition to the information about the connection in which the transmission frame 12-1 is transmitted.

The access point apparatus in a case of transmitting transmission frames using multiple connections can state information associated with the destinations in the transmission frames. Like the wireless LAN standards of the related art, the access point apparatus can state a MAC address of a destination communication apparatus in a destination field of the MAC header of the transmission frame. The access point apparatus according to the present embodiment can state prescribed information in the destination field of the MAC header. For example, the access point apparatus can state the MAC address of the access point apparatus in the destination field, and state information indicating the destination communication apparatus (AID, Partial AID, MAC address) in the EHT SIG of the transmission frame. The configuration in this way allows a legacy communication apparatus to know at least that a transmission frame is not destined to the legacy communication apparatus, while allowing the communication apparatus according to the present embodiment to determine whether a transmission frame is destined to the communication apparatus by reading the EHT SIG.

The information indicating the destination communication apparatus does not necessarily need to be stated in all of the transmission frames transmitted in the multiple connections. For example, in a case that the access point apparatus transmits frames to the same communication apparatus by using the multiple connections, the access point apparatus can state the information indicating the destination communication apparatus in any one of the frames being transmitted in multiple connections, while stating, in the other transmission frames, information indicating other connections maintained by the access point apparatus (e.g., the connection described above in which the frames with the information indicating the destination communication apparatus being stated therein are transmitted).

The access point apparatus, in the case of transmitting the frames using the multiple connections, can notify whether the frame ends of the frames are to be simultaneously reached according to a stating method of the destination communication apparatus in the frame. For example, in a case that the access point apparatus does not cause the frame ends to be simultaneously reached, the access point apparatus may not state the information indicating the destination communication apparatus in the EHT-SIG, or may state prescribed information in the field. This is because, so long as the access point apparatus supports the STR or does not disable the function of the STR, it is no matter that the transmission and/or reception of the frames are simultaneously performed in the multiple connections.

The access point apparatus can determine whether to cause the frame ends to be simultaneously reached based on whether the access point apparatus supports the STR, or whether the access point apparatus can perform the STR in radio parameters configured for the multiple connections. In a case that a frequency difference between the carrier frequencies configured for the multiple connections is equal to or less than a prescribed value, the access point apparatus can cause the frame ends to be simultaneously reached.

In a case that the access point apparatus attempts to transmit a frame (in a case that data to be transmitted is generated in the buffer of the access point apparatus, or in a case of requesting a frame transmission from the connected station apparatus), the access point apparatus can perform a backoff process in each of the multiple connections. The access point apparatus can configure a backoff counter common to the multiple connections, and reduce (decrement) the backoff counter in a case that the radio medium is idle in each connection. At this time, in a case that the radio medium is determined to be idle in at least one connection in the multiple connections, the backoff process is continued. Then, in a case that the backoff counter is 0, the frame transmission can be performed in the connection in which the radio medium is determined to be idle at that time. Note that, in a case that the radio medium is determined to be busy in a connection during the backoff process, the frame transmission is not performed in that connection thereafter even if the radio medium is again determined to be idle during the backoff process.

The access point apparatus can perform multiple backoff processes in parallel in the MLO. The access point apparatus can configure a random backoff counter for each of the multiple connections. Then, in a case that the backoff counter is 0 in each connection, the frame transmission can be performed in the connection.

The access point apparatus can perform the backoff process dedicated to MLO in addition to the normal backoff process. The access point apparatus can perform in the MLO the normal backoff process in a prescribed connection (primary connection, control connection), while configuring the backoff counter dedicated to MLO in the multiple connections other than the primary connection and reducing the value of the backoff counter dedicated to MLO in a case that the radio medium in at least one of the multiple connections other than the primary connection is determined to be idle and the radio medium in the primary connection is determined to be idle. In a case that the backoff counter in the primary connection is 0, and the backoff counter dedicated to MLO is 0 at that time, the access point apparatus can perform the frame transmissions in the primary connection and in the connection in which the radio medium has been continuously determined to be idle until the backoff counter dedicated to MLO becomes 0. The access point apparatus can independently configure the backoff counter dedicated to MLO in each of the multiple connections other than the primary connection. In this case, in a case that the backoff counter in the primary connection is 0, the access point apparatus can perform the frame transmission in each of the multiple connections in which the backoff counter dedicated to MLO is 0. In a case that the backoff counter dedicated to MLO configured for each of the multiple connections is smaller than a prescribed value, the access point apparatus can perform the frame transmission in the connection associated with the backoff counter dedicated to MLO.

The access point apparatus can make multiple station apparatuses connected thereto perform the frame transmissions using the multiple connections the access point apparatus maintains. At this time, the access point apparatus can maintain, for each station, the connection in which the frame transmission is to be performed. The access point apparatus can transmit a trigger frame that solicits a frame transmission in each station. The access point apparatus can state, in the trigger frame, information associated with the connection in which each station performs the frame transmission. Note that the trigger frame can include information indicating whether a carrier sense is to be performed for the destination terminal apparatus of the trigger frame. The trigger frame can be destined for multiple stations. In this case, information related to a connection different from a connection in which the access point apparatus transmits the trigger frame can be stated in the trigger frame. For example, in a case that the access point apparatus transmits the trigger frame based on a first connection, a frame transmission based on a second connection can be solicited for the station apparatus that is the destination of the trigger frame.

The access point apparatus can notify the multiple connected station apparatuses of candidates for multiple connections in each of which the frame transmission can be performed. The access point apparatus can state, in the trigger frame transmitted to each station apparatus, the candidates for the multiple connections in each of which the frame transmission can be performed. At this time, the station apparatus can select any one or more connections from the candidates for the multiple connections stated in the trigger frame to perform a frame transmission. Note that, in this case, the frame transmitted by the station apparatus may collide against the frame transmitted by another station apparatus.

Thus, in a case that the access point apparatus in the MLO indicates the frame transmission to each station apparatus, the access point apparatus can configure a dedicated backoff counter for each station. For example, the access point apparatus can state information about the dedicated backoff counter (a value associated with an initial random number of a random backoff value) in the frame (MLO setup frame) transmitted in a case of configuring the beacon frame or the MLO.

Each station apparatus can configure a backoff value dedicated to MLO based on the information about the dedicated backoff counter. Then, in a case that the candidates for the multiple connections in each of which the frame transmission can be performed are stated in the trigger frame transmitted from the access point apparatus, each station apparatus can reduce the dedicated backoff counter, and select one or more connections from the candidates for the multiple connections in a case that the dedicated backoff counter is 0 to perform the frame transmission. The way of reducing the dedicated backoff counter is not limited to anything, and for example, the station apparatus can reduce the dedicated backoff counter by a prescribed number each time the station apparatus receives the trigger frame. For example, in a case that the station apparatus after receiving the trigger frame can determine that the radio medium is idle in at least one connection of the candidates for the multiple connections, the station apparatus can reduce the dedicated backoff counter. In this case, the station apparatus can perform the frame transmission in a connection in which the radio medium has been never busy even until the dedicated backoff counter becomes 0.

The station apparatus can notify the access point apparatus of rejecting participation in the MLO performed by the access point apparatus. This similarly applies also to a case that the station apparatus makes a notification that the station apparatus holds the ability to participate in the MLO in a case of connecting to the access point apparatus.

The access point apparatus and the station apparatus according to the present embodiment can perform the same operation. In other words, the station apparatus can configure the MLO with the different access point apparatuses. In this case, the station apparatus can make a notification that the station apparatus maintains the connection with another access point apparatus to each of the access point apparatuses. Even in a case that multiple access point apparatuses connected to the station apparatus belong to different BSSs, the station apparatus can recognize that the frames transmitted from the respective access point apparatuses are those belonging to the BSSs the same as the BSSs connected to the station apparatus. In other words, typically, a first station apparatus connected to a first access point apparatus recognizes that a frame transmitted from a second access point apparatus forming a BSS different from the first access point apparatus is a frame (inter BSS frame) for a BSS (Overlapped BSS (OBSS)) different from a BSS connected to the first station apparatus. However, in a case that the station apparatus according to the present embodiment maintains the connections to both the first access point apparatus and the second access point apparatus, the station apparatus can recognize that both frames transmitted from the first access point apparatus and the second access point apparatus are frames for the BSS (intra BSS frame) connected to the station apparatus.

According to the above-described method, a management efficiency for the station apparatus is improved, however, a loss of a frame transmission occasion due to a detection of the intra BSS frame is also incurred. Thus, in a case that the station apparatus according to the present embodiment maintain the connections with multiple access point apparatuses, the station apparatus can also recognize all of the frames transmitted from the multiple access point apparatuses as the inter BSS frames.

The access point apparatus and the station apparatus according to the present embodiment can state, in the frames to transmit, information (BSS color) associated with the BSS connected to the access point apparatus and the station apparatus. The access point apparatus and the station apparatus in a case of using multiple connections in the MLO can state, as the information associated with the BSS, information different from information in a case of not using the multiple connections. The different information may be information indicating a new BSS or may be information indicating that the frame is associated with the MLO.

According to the method described above, the communication apparatus can efficiently perform communication using multiple connections, so improvement in frequency efficiency is achieved.

2. Matters Common to All Embodiments

A program that operates in the radio communication apparatus according to an aspect of the present invention is a program (a program for causing a computer to function) for controlling the CPU or the like to implement the functions of the aforementioned embodiments related to an aspect of the present invention. The information handled by these apparatuses is temporarily held in a RAM at the time of processing, is then stored in various types of ROMs and HDDs, and is read by the CPU as necessary to be corrected and written. Here, a semiconductor medium (ROM, a nonvolatile memory card, or the like, for example), an optical recording medium (DVD, MO, MD, CD, BD, or the like, for example), a magnetic recording medium (magnetic tape, a flexible disk, or the like, for example), and the like can be given as examples of recording media for storing the programs. In addition to implementing the functions of the aforementioned embodiments by performing loaded programs, the functions of the present invention may be implemented by the programs running cooperatively with an operating system, other application programs, or the like in accordance with indications included in those programs.

In a case of delivering these programs to the market, the programs can be stored and distributed in a portable recording medium, or transferred to a server computer connected via a network such as the Internet. In this case, storage devices in the server computer are also included in an aspect of the present invention. A part or an entirety of the communication apparatus in the aforementioned embodiments may be implemented as an LSI that is typically an integrated circuit. The functional blocks of the communication apparatus may be individually implemented as chips or may be partially or completely integrated into a chip. In a case that the functional blocks are integrated, an integrated circuit controller for controlling them is added.

The circuit integration technique is not limited to LSI, and the integrated circuits for the functional blocks may be realized as dedicated circuits or a multi-purpose processor. In a case that, with advances in semiconductor technology, a circuit integration technology replacing an LSI appears, it is also possible to use an integrated circuit based on the technology.

Note that the invention of the present application is not limited to the above-described embodiments. The radio communication apparatus according to the invention of the present application is not limited to the application in the mobile station apparatus, and, needless to say, can be applied to a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiments of the invention have been described in detail thus far with reference to the drawings, but the specific configuration is not limited to the embodiments. Other designs and the like that do not depart from the essential spirit of the invention also fall within the scope of the claims.

INDUSTRIAL APPLICABILITY

An aspect of the present invention can be preferably used in a communication apparatus and a communication method.

REFERENCE SIGNS LIST 1-1, 1-2 Access point apparatus
2-1 to 8 Station apparatus
3-1, 3-2 Management range
10001-1 Higher layer processor
10002-1 Autonomous distributed controller
10002a-1 CCA processor
10002b-1 Backoff processor
10002c-1 Transmission determiner
10003-1 Transmitter
10003a-1 Physical layer frame generator
10003b-1 Radio transmitter
10004-1 Receiver
10004a-1 Radio receiver
10004b-1 Signal demodulator
10005-1 Antenna unit

The invention claimed is:

1. An access point apparatus configured to communicate with a station apparatus using a plurality of links, the access point apparatus comprising:
  a transmitter configured to transmit a plurality of Physical Protocol Data Units (PPDUs) soliciting a plurality of response frames; and a receiver configured to receive the plurality of response
frames, the plurality of response frames being received
on the plurality of links, wherein in a case of an operation on a pair of non-Simultaneously
Transmission and Reception (STR) links, an end time
of each of the plurality of PPDUs is aligned, and dummy information is included in at least one of the
plurality of PPDUs as a part of the at least one of the
plurality of PPDUs to align the end time of each of the
plurality of PPDUs.

2. The access point apparatus according to claim 1, wherein:

the plurality of links includes a first link and a second link;
the access point apparatus further comprises a first backoff counter configured to decrement in a case that it is determined that the first link is in an idle state; and
the transmitter is configured to initiate a transmission of a data frame when the first backoff counter indicates 0 and the second link obtains a transmission opportunity (TXOP).

3. A station apparatus configured to communicate with an access point apparatus using a plurality of links, the station apparatus comprising:

a receiver configured to receive a plurality of Physical Protocol Data Units (PPDUs) soliciting the station apparatus to transmit a plurality of response frames; and a transmitter configured to transmit the plurality of response frames, the plurality of response frames being transmitted on the plurality of links, wherein in a case of an operation on a pair of non-Simultaneously Transmission and Reception (STR) links, an end time of each of the plurality of PPDUs is aligned, and dummy information is included in at least one of the plurality of PPDUs as a part of the at least one of the plurality of PPDUs to align the end time of each of the plurality of PPDUs.

4. The station apparatus according to claim 3, wherein:

the plurality of links includes a first link and a second link;
the station apparatus further comprises a first backoff counter configured to decrement in a case that it is determined that the first link is in an idle state; and
the transmitter is configured to initiate a transmission of a data frame when the first backoff counter indicates 0 and the second link obtains a transmission opportunity (TXOP).

5. A communication method for an access point apparatus to communicate with a station apparatus using a plurality of links, the communication method comprising:

transmitting a plurality of Physical Protocol Data Units (PPDUs) soliciting a plurality of response frames; and receiving the plurality of response frames, the plurality of response frames being received on the plurality of links, wherein in a case of an operation on a pair of a non-Simultaneously Transmission and Reception (STR) links, an end time of each of the plurality of PPDUs is aligned, and dummy information is included in at least one of the plurality of PPDUs as a part of the at least one of the plurality of PPDUs to align the end time of each of the plurality of PPDUs.

6. The access point apparatus according to claim 1, wherein the at least one of the plurality of PPDUs includes information indicating whether the dummy information is included in the at least one of the plurality of PPDUs.

* * * * *